United States Patent [19]

Swift et al.

[11] 4,293,716

[45] Oct. 6, 1981

[54] PROCESS FOR PREPARING ALKYLDIMETHYLAMINES

[75] Inventors: Harold E. Swift, Gibsonia; Robert A. Innes, Monroeville, both of Pa.; Phillip Adams, Murray Hill, N.J.

[73] Assignees: Gulf Research & Development Company, Pittsburgh, Pa.; Kewanee Industries, New York, N.Y.

[21] Appl. No.: 108,479

[22] Filed: Dec. 31, 1979

[51] Int. Cl.$^3$ ............................................. C07C 85/06
[52] U.S. Cl. .................................... 564/480; 564/479
[58] Field of Search ............ 260/583 R, 583 H, 585 B

[56] References Cited

FOREIGN PATENT DOCUMENTS 2709864  8/1978  Fed. Rep. of Germany ... 260/583 R

Primary Examiner—John Doll
Attorney, Agent, or Firm—Deane E. Keith; Forrest D. Stine; Joseph J. Carducci

[57] ABSTRACT

A process for preparing alkyldimethylamines which comprises passing through a fixed bed, containing a copper catalyst, optionally chromium oxide, and an oxide of a Group I metal, selected amounts of dimethylamine and an alcohol or mixtures of alcohols.

22 Claims, No Drawings

PROCESS FOR PREPARING ALKYLDIMETHYLAMINES

BACKGROUND OF THE INVENTION

1. Field of the Invention

This invention relates to a process for reacting dimethylamine with an alcohol or mixtures of alcohols to obtain an alkyldimethylamine while substantially decreasing the formation of undesired byproduct alkylmonomethylamine which comprises passing selected amounts of dimethylamine and said alcohol through a fixed bed containing copper, optionally chromium oxide and an oxide of a Group I metal.

2. Description of the Prior Art

The reaction of fatty alcohols with dimethylamine, to yield the corresponding alkyldimethylamines has been known for many years. The reaction has been carried out in the liquid and vapor phase, at atmospheric or higher pressures, generally over a copper- or nickel-containing catalyst in the presence of hydrogen. Both stirred-autoclave and fixed-bed type reactors have been employed. In U.S. Pat. No. 3,223,734 dodecyl alcohol was reacted with dimethylamine in the presence of Raney Nickel to yield dodecyldimethylamine. The tertiary amine assay was only 69.5 percent. In U.S. Pat. No. 3,366,687 dimethylamine was reacted with various alcohols in the liquid phase in the presence of hydrogen over a fixed-bed of barium-chromite catalyst. The yields of alkyldimethylamine were less than 75 percent.

More recently, German application Nos. 2,749,064; 2,749,065 and 2,749,066 disclosed the use of copper on an alumina support promoted with rhenium, molybdenum, tungsten, zinc and chromium oxides. The reported yields of dimethyldodecylamine were less than 85 percent. U.S. Pat. No. 4,138,437 discloses a process for carrying out the reaction in the liquid phase over a copper-chromium oxide catalyst wherein the liquid alcohol is reacted with a circulating gaseous mixture containing hydrogen and 1-20 percent by volume dimethylamine to obtain up to 93.5 percent yield of dodecyldimethylamine.

German application No. 2,709,864 claims a method for preparing tertiary aliphatic amines by reacting an alcohol and dimethylamine over a catalyst containing copper (II) oxide, an alkali and/or alkaline earth metal oxide, and/or chromium (III) oxide. In accordance with the method claimed, the reaction may be carried out in a fixed-bed or stirred-autoclave reactor and the weight ratio of copper(II) and chromium (III) oxides to alkali and alkaline earth metal oxide can range between 1 to 0.002 and 1 to 0.1. Example 1 of this application employs a catalyst containing 1.0 percent Na$_2$O, while the six other examples employ catalysts containing 0.1 percent Na$_2$O or none at all. In Example 1, the yield of dodecyldimethylamine was only 82 percent. The yield of alkyldimethylamines exceeded 90 percent in the other examples. Thus, there is nothing in the application to show that the use of more than 0.1 percent alkali is advantageous.

Similar work is reported in an article published by A. Baikar and W. Richarz in *Ind. Eng. Chem. Prod. Res. Dev.*, 16, 261-265 (1977). The authors employ a catalyst containing CuO (25 percent), Cr$_2$O$_3$ (1 percent), Na$_2$O (0.1 percent) SiO$_2$ (70 percent), and H$_2$O (about 4 percent). It is stated that in the vapor phase fixed-bed process optimal results are obtained with a dimethylamine to alcohol molar ratio of 5.5 and that a 92-96 percent yield of dodecyldimethylamine is obtained. No mention is made of the formation of alkylmonomethylamines.

We have found upon repeating this experiment that the type of chromatographic column used by Baikar and Richarz does not separate dodecylmonomethylamine from dodecyldimethylamine. With a 10 percent carbowax 20 M+2 percent KOH column we have shown that three to five weight percent of the product identified by Baikar and Richarz as dodecyldimethylamine is actually alkylmonomethylamine.

This is a very significant finding from an industrial standpoint because the corresponding alkylmonomethyl- and alkyldimethylamines have very close boiling points and are difficult to separate by distillation. The presence of too much of the alkylmonomethylamine impurity can cause problems in down-stream processes utilizing the alkyldimethylamine product. For example, when the alkyldimethylamine is reacted with benzyl chloride to make an alkyldimethylbenzylchloride solution, the impurity will be converted to alkylmethyldibenzyl chloride altering the properties of the final product.

SUMMARY OF THE INVENTION

The invention defined and claimed herein relates to an improvement in a process wherein an alcohol or mixture of alcohols is reacted with dimethylamine in the presence of a copper catalyst, and optionally chromium oxide, to obtain an alkyldimethylamine by passing said reactants through a fixed bed of such catalyst which comprises substantially decreasing the formation of byproduct alkylmonomethylamine by introducing the dimethylamine and alcohol into the reaction zone in a molar ratio of about 3:1 to about 1:1 and carrying out the reaction in the additional presence of about 0.2 to about 2.5 weight percent, based on the weight of said catalyst, of an oxide of a Group I metal.

BRIEF DESCRIPTION OF THE INVENTION

The process defined and claimed herein is effected by passing the reactants, alcohol and dimethylamine, at elevated temperatures, preferably in the vapor phase, through a fixed catalyst bed.

The alcohols that can be used herein can be defined by the following structural formula:

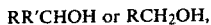

RR'CHOH or RCH$_2$OH, wherein R and R', the same or different, can be straight or branched chain alkyl or alkenyl groups having from four to 20 carbon atoms, preferably from eight to 18 carbon atoms. Specific examples of alcohols falling within the above definition include 1-octanol, 1-decanol, 1-dodecanol, 1-tetradecanol, 1-hexadecanol, 1-nonanol, 2-methyl-1-heptanol, 2-methyl-1-dodecanol, 9-octadecen-1-ol, 2-octanol, 2-ethyl-1-hexanol, etc.

Specific examples of alkyldimethylamines resulting from the reaction of the above-identified alcohols with the dimethylamine include octyldimethylamine, decyldimethylamine, dodecyldimethylamine, tetradecyldimethylamine, hexadecyldimethylamine, nonyldimethylamine, 2-methylheptyldimethylamine, 2-methyldodecyldimethylamine, 9-octadecenyldimethylamine, 2-ethylhexyldimethylamine, 1-methylheptyldimethylamine, etc. The undesired byproduct alkylmonomethylamines that can also result from the reaction will obviously be identical to the desired alkyldimethylamine except that one of the methyl groups is replaced by hydrogen.

In order to substantially decrease the amount of byproduct alkylmonomethylamine produced during the process, it is critical that the molar ratio of the dimethylamine to alcohol introduced into the reaction zone be maintained within about 3:1 to about 1:1, preferably about 2:1 to about 1:1.

In the process of this invention the reactants are passed through a fixed catalyst bed, preferably in the vapor phase. The liquid hourly space velocity (volume of liquid alcohol per volume of catalyst per hour) is about 0.05 to about 5.0, preferably about 0.1 to about 2.0, while maintaining a temperature therein at about 150° to about 350° C., preferably about 200° to about 275° C., and a total pressure of about atmospheric (ambient) to about 100 pounds per square inch gauge (about 0 to about 690 kPa), preferably about atmospheric to about 15 pounds per square inch gauge (about 0 to about 103 kPa). A gaseous diluent, such as nitrogen or hydrogen, can also be introduced into the reaction zone, together with reactants, to aid in maintaining a vapor phase therein. Hydrogen is preferred for such purpose, since it additionally aids in prolonging catalyst life and increases selectivities. If such diluents are used the molar ratios of total diluent to alcohol can be in the range of about 1:1 to about 50:1, preferably about 2:1 to about 10:1.

The catalyst bed is composed of a suitable support, such as silica gel ($SiO_2$), alumina, kieselguhr, etc., preferably silica gel, carrying copper and, optionally, chromium oxide, wherein the amount of copper will be in the range of about five to about 30 weight percent, preferably about 10 to about 25 percent, and chromium oxide can be in the range of about 0 up to about five weight percent, preferably about 0.5 to about 2.5 weight percent. It is also critical herein in order to substantially decrease the amount of byproduct alkylmonomethylamine that the catalyst additionally carry from about 0.2 to about 2.5 weight percent, preferably about 0.5 to about 1.5 weight percent, of an oxide of Group I metal (lithium, sodium, potassium, rubidium or cesium) based on the weight of the total catalyst. Since the reaction rate may be limited by the diffusion of reactants into the catalyst pores, it is preferred that catalyst particle size be as small as possible without causing excessive pressure drop. Normally, this means catalyst particles ranging from about eight millimeters to about 0.4 millimeter in diameter, preferably from about two millimeters to about 0.6 millimeter. To further facilitate the diffusion of reactants into the pores it is preferred that average pore size be at least about 50 angstroms. The B. E. T. surface area of the catalyst should be at least about 50 square meters per gram.

The catalyst employed herein can be prepared in any suitable manner. For example, a suitable support, such as defined above, is impregnated at ambient conditions with selected amounts of a water-soluble salt of copper, a water-soluble salt of a Group I metal and, optionally, a water-soluble salt of chromium. Specific examples of such salts that can be used include $Cu(NO_3)_2.3H_2O$, $Cu(NO_3)_2.6H_2O$, $CuCl_2.2H_2O$, $CuCl_2$, $Cu(CHO)_2$, $Cu(C_2H_3O_2).H_2O$, $Cr(NO_3)_3.9H_2O$, $Cr(Cl)_3.10H_2O$, $Cr(C_2H_3O_2)_3.H_2O$, $KNO_3$, $KCl$, $KC_2H_3O_2$, $KOH$, $CsNO_3$, $NaNO_3$, $RbNO_3$, $NaOH$, etc. The impregnated catalyst is dried and then calcined in air at ambient pressure and a temperature in the range of about 200° to about 500° C. for about 15 minutes to 24 hours. At this stage each of the metals will be in their oxide state. In order to activate the catalyst, that is, convert the copper oxide to elemental copper, the catalyst can be contacted with hydrogen or a blend of hydrogen with an inert gas at ambient pressure and a temperature of about 150° to about 300° C. for about 15 minutes to about 24 hours. The alkali metal oxide and chromium oxide ($Cr_2O_3$), if used, will remain in their oxide state. If hydrogen is used as diluent in the reaction the hydrogen pretreatment may be omitted, for in such case the desired reduction will occur in situ.

The desired alkyldimethylamine product can be recovered from the reaction product in any suitable manner. In one procedure that can be used to recover the desired product, the effluent from the reaction zone is passed through a condenser to cool the reaction product to about 30° to 150° C. Hydrogen, if used, unreacted dimethylamine, water and small amounts of monomethylamine and trimethylamine are removed overhead. The condensed liquid product is then sent to a distillation stage, wherein the desired alkyldimethylamine product is separated from heavier products, such as dialkyl methylamines. The overhead gases may be cooled further to condense part of the water, then recycled to the reactor.

DESCRIPTION OF PREFERRED EMBODIMENTS

Example I

This example was carried out in accordance with the preferred dictates of Baikar and Richarz, referred to above, for reacting an alcohol with dimethylamine to obtain an alkyldimethylamine using a fixed catalyst bed containing copper oxide and chromium oxide. The reactor was charged with 10 to 20 mesh particles of silica gel carrying copper oxide and chromium oxide thereon of the following composition: 25 weight percent CuO, 1.0 weight percent $Cr_2O_3$, 0.1 weight percent $Na_2O$, 70 weight percent $SiO_2$ and 4.0 weight percent water. The small amount of sodium oxide present was inherent in the silica and was not added thereto. There was passed downwardly through the catalyst bed hydrogen, dimethylamine and 1-dodecanol in a molar ratio of 5.15:5.5:1.0 in vapor phase at a liquid hourly space velocity of 1.09 (volume of alcohol per volume of catalyst per hour) at ambient pressure and a temperature of 230° C. over a period of 16 hours. All of the alcohol was reacted and the product was analyzed as follows: 92.4 weight percent dodecyldimethylamine, 4.3 weight percent dodecylmonomethylamine, 0.8 weight percent didodecylmonomethylamine and 2.5 weight percent of unidentified material.

Example II

A catalyst was prepared containing 22.0 weight percent CuO and 1.0 weight percent $Cr_2O_3$ by impregnating at ambient conditions 230 grams of Davison Chemical Co. Grade 59 Silica Gel ($SiO_2$) in 3 to 8 mesh granular form with a 1520 milliliter aqueous solution containing 1068.13 grams of $Cu(NO_3)_2.3H_2O$ and 84.13 grams of $Cr(NO_3)_2.3H_2O$ and 84.13 grams of $Cr(NO_3)_3.9H_2O$. The resulting material was dried at 120° C. overnight and then calcined in air at ambient pressure and at 400° C. for one hour. The resulting catalyst carried 22 weight percent CuO and 1.0 weight percent $Cr_2O_3$. Portions of the catalyst so prepared were further treated with $KNO_3$ or with $CsNO_3$ to obtain a catalyst containing selected amounts of potassium oxide or cesium oxide. For example, a catalyst was prepared carrying additionally 1.2 weight percent $K_2O$ by impregnating 130.45 grams of the catalyst obtained above with 129 grams of an aqueous solution containing 3.4 grams of $KNO_3$. The impregnated catalyst was oven-dried overnight at ambient pressure and a temperature of 120° C. and then calcined in air at ambient pressure and a temperature of 400° C. for one hour. Another series of catalysts was prepared in identical fashion, except that the chromium addition was omitted.

The reactions herein were carried out in a 43-inch (109-centimeter) long, stainless-steel, tubular, fixed-bed reactor having an internal diameter of ⅞ inch (2.22 centimeters) and an external diameter of 1.0 inch (2.54 centimeters). The reactor was heated with an electric tube furnace. The temperature of the catalyst bed was monitored with thermocouples situated in a ¼-inch (0.64-centimeter) O.D. axial thermowell. The reactor was charged with 200 cubic centimeters of catalyst to form a catalyst bed therein having a length of 22 inches (56 centimeters). Quartz chips were positioned above and below the catalyst bed.

The catalyst was reduced at ambient pressure and a temperature of 230° C. for one hour in hydrogen prior to each run. In each of the runs, except as noted hereinafter, a stream containing hydrogen, dimethylamine and 1-dodecanol in a molar ratio of 5.0:2.0:1.0 was passed in vapor phase downwardly through the catalyst bed over a period of 16 hours at a space velocity (volume of alcohol per volume of catalyst per hour) of 0.25 while maintaining ambient pressure therein and a temperature of 230° C. for a period of 16 hours. In Run No. 10 the conditions set forth above were maintained except that the molar ratio of hydrogen, dimethylamine and 1-dodecanol entering the reactor was 5:1.12:1.0 and the liquid hourly space velocity was 0.15. The gases leaving the reactor were passed through a heated transfer line to a separator maintained at 40° to 60° C. and the liquid products obtained therein were analyzed by gas chromatography. The results obtained are set forth below in Table I.

mine obtained was achieved in each case. A comparable reduction in the amount of dodecylmonomethylamine obtained was noted in each of Runs Nos. 6, 7 and 8 when a small amount of $K_2O$ was added to the catalyst of Run No. 5 containing $Cr_2O_3$. Similarly, improved results were obtained in Run No. 9 when $Cs_2O$ was also present in the catalyst system. The addition of the alkali metal oxide promoter also reduces the rate of reaction. Thus, the decrease in alkylmonomethylamine must be weighed against the decrease in catalyst activity in determining the optimum amount of promoter. That a further decrease in the amount of alkylmonomethylamine formed may be achieved by reducing the molar ratio of the reactant amine to reactant alcohol in the feed is apparent from a comparison of Run No. 10 with Run No. 6. When the molar feed ratio of dimethylamine to 1-dodecanol was reduced from 2.0:1.0 in Run No. 6 to 1.12:1.0 in Run No. 10, the amount of dodecylmonomethylamine was reduced from 2.0 weight percent to the relatively low level of 0.4 weight percent.

Example III

A catalyst consisting of 22 weight percent CuO, 1.0 weight percent $Cr_2O_3$, and 0.6 weight percent $K_2O$ was prepared as described in Example II, except that the silica-gel was crushed and sieved to obtain 10–20 mesh particles prior to impregnation. The smaller particle size resulted in greatly increased activity, making it possible to achieve high conversions at substantially increased space velocities. The catalyst was evaluated using two mixed alcohol feedstocks. Feedstock A contained 0.4 percent 1-decanol, 6.6 percent 1-dodecanol, 64.0 percent 1-tetradecanol, and 27.3 percent hexadecanol by weight. Feedstock B contained 70 percent 1-dodecanol and 30 percent 1-tetradecanol by weight. The reaction temperature was 250° C. The molar ratio of hydrogen to alcohol feed was maintained at 5.0, while the ratio of dimethylamine to alcohol and liquid hourly space velocity of the alcohol were varied. The results are shown in Table II. The table shows that mixed alcohol feeds can be employed and further demonstrates that alkylmonomethylamine formation can be

TABLE I

| | Catalyst Charge Weight Percent | | | | Product, Weight Percent | | | | |
|---|---|---|---|---|---|---|---|---|---|
| Run No. | CuO | $Cr_2O_3$ | $K_2O$ | $Cs_2O$ | Dodecyl-dimethyl-amine | Dodecyl-monomethyl-amine | Unreacted 1-dodeca-nol | Didoceyl methyl-amine | Unidentified Material |
| 1 | 22 | None | None | None | 92.3 | 3.0 | 0.2 | 2.3 | 2.2 |
| 2 | 22 | None | 0.6 | None | 91.9 | 2.0 | 1.2 | 2.6 | 2.3 |
| 3 | 22 | None | 1.2 | None | 82.7 | 1.9 | 7.6 | 3.7 | 4.1 |
| 4 | 22 | None | 2.4 | None | 78.8 | 1.2 | 12.1 | 3.7 | 4.2 |
| 5 | 22 | 1.0 | None | None | 92.2 | 3.6 | 0.2 | 2.4 | 1.6 |
| 6 | 22 | 1.0 | 0.6 | None | 93.4 | 2.0 | 0.5 | 1.5 | 2.1 |
| 7 | 22 | 1.0 | 1.2 | None | 93.3 | 2.0 | 0.4 | 1.7 | 2.6 |
| 8 | 22 | 1.0 | 2.4 | None | 76.2 | 0.6 | 16.9 | 3.7 | 3.6 |
| 9 | 22 | 1.0 | None | 1.0 | 94.1 | 2.3 | 0.1 | 1.3 | 2.2 |
| 10 | 22 | 1.0 | 0.6 | None | 89.5 | 0.4 | 5.1 | 2.6 | 2.4 |

The data in Table I clearly illustrate the advantage of having an oxide of a Group I metal in the catalyst system herein. In Run No. 1 when 1-dodecanol was reacted with dimethylamine solely in the presence of copper as catalyst three weight percent of the undesired dodecylmonomethylamine was obtained. In Run No. 5 with a small amount of $Cr_2O_3$ additionally present the amount of dodecylmonomethylamine was 3.6 weight percent. When a small amount of $K_2O$ was added to the catalyst of Run No. 1 in Runs Nos. 2, 3 and 4 a significant reduction in the amount of dodecylmonomethylainhibited by adding alkali metal oxide to the catalyst and by reducing the ratio of dimethylamine to alcohol in the feed.

TABLE II

| | | | Product, Weight Percent | | |
|---|---|---|---|---|---|
| Feed | LHSV | DMA/ROH | ROH | $RMe_2N$ | RMeNH |
| A | 0.65 | 3.0 | 0.8 | 93.5 | 2.4 |
| A | 0.50 | 2.0 | 1.2 | 93.3 | 1.5 |
| A | 0.35 | 1.5 | 1.1 | 94.4 | 1.3 |
| B | 1.0 | 3.0 | 0.3 | 93.5 | 2.4 |

TABLE II-continued

| Feed | LHSV | DMA/ROH | Product, Weight Percent | | |
|---|---|---|---|---|---|
| | | | ROH | RMe$_2$N | RMeNH |
| B | 1.0 | 2.0 | 2.2 | 91.2 | 1.6 |
| B | 0.7 | 1.5 | 1.1 | 93.3 | 1.4 |

R = alkyl group
Me = methyl
DMA = dimethylamine

Obviously, many modifications and variations of the invention, as hereinabove set forth, can be made without departing from the spirit and scope thereof, and therefore only such limitations should be imposed as are indicated in the appended claims.

We claim:

1. In a process wherein an alcohol or mixture of alcohols is reacted with dimethylamine in the presence of copper catalyst to obtain alkyldimethylamine or alkenyldimethylamine by passing said reactants in the vapor phase through a fixed bed of such catalyst, the improvement which comprises substantially decreasing the formation of byproduct alkylmonomethylamine by introducing into the reaction zone the dimethylamine and alcohol in a molar ratio of about 3:1 to about 1:1 and carrying out the reaction in the additional presence of about 0.5 to about 1.5 weight percent of an oxide of a Group I metal.

2. The process of claim 1 wherein the molar ratio of said reactant amine to reactant alcohol is in the range of about 2:1 to about 1:1.

3. The process of claim 1 wherein said Group I metal oxide is K$_2$O.

4. The process of claim 1 wherein said Group I metal oxide is K$_2$O.

5. The process of claim 1 wherein said Group I metal oxide is Cs$_2$O.

6. The process of claim 1 wherein said Group I metal oxide is Cs$_2$O.

7. The process of claim 1 wherein the amount of copper present is in the range of about five to about 30 weight percent.

8. The process of claim 1 wherein the amount of copper present is in the range of about 10 to about 25 weight percent.

9. The process of claim 7 wherein Cr$_2$O$_3$ is also present in an amount in the range up to about five weight percent.

10. The process of claim 8 wherein Cr$_2$O$_3$ is also present in an amount in the range of about 0.5 to about 2.5 weight percent.

11. The process of claim 1 wherein a diluent selected from the group consisting of nitrogen and hydrogen is also present in the reaction mixture.

12. The process of claim 11 wherein said diluent is hydrogen.

13. The process of claim 1 wherein the charge additionally contains hydrogen, such that the molar ratio of hydrogen to alcohol is in the range of about 1:1 to about 50:1.

14. The process of claim 1 wherein the charge additionally contains hydrogen such that the molar ratio of hydrogen to alcohol is in the range of about 2:1 to about 10:1.

15. The process of claim 1 wherein said reactant alcohol has from four to 20 carbon atoms.

16. The process of claim 1 wherein said reactant alcohol has from eight to 18 carbon atoms.

17. The process of claim 1 wherein said reactant alcohol is 1-dodecanol.

18. The process of claim 1 wherein the liquid (alcohol) hourly space velocity is about 0.05 to about 5.0.

19. The process of claim 1 wherein the liquid (alcohol) hourly space velocity is about 0.1 to about 2.0.

20. The process of claim 1 wherein the reaction temperature is in the range of about 150° to about 350° C.

21. The process of claim 1 wherein the reaction temperature is in the range of about 200° to about 275° C.

22. The process of claim 1 wherein the copper catalyst is mounted on a silica gel support.

* * * * *